(12) United States Patent  (10) Patent No.: US 9,027,708 B2
Vauchel et al.  (45) Date of Patent: May 12, 2015

(54) AIRCRAFT TURBOJET ENGINE NACELLE AIR INTAKE MAINTENANCE TROLLEY

(75) Inventors: Guy Vauchel, Le Havre (FR); Jean-Philippe Dauguet, Tournefeuille (FR); Stephane Beilliard, Toulouse (FR)

(73) Assignee: Aircelle, Gonfreville l'Orcher (FR)

( * ) Notice: Subject to any disclaimer, the term of this patent is extended or adjusted under 35 U.S.C. 154(b) by 542 days.

(21) Appl. No.: 12/739,289

(22) PCT Filed: Jun. 20, 2008

(86) PCT No.: PCT/FR2008/000865
§ 371 (c)(1),
(2), (4) Date: Apr. 22, 2010

(87) PCT Pub. No.: WO2009/053539
PCT Pub. Date: Apr. 30, 2009

(65) Prior Publication Data
US 2010/0314198 A1    Dec. 16, 2010

(30) Foreign Application Priority Data

Oct. 23, 2007 (FR) ................................. 07 07399

(51) Int. Cl.
*E04G 3/32* (2006.01)
*B64F 5/00* (2006.01)
(52) U.S. Cl.
CPC ................ *B64F 5/00* (2013.01); *B64F 5/0036* (2013.01)
(58) Field of Classification Search
USPC ................ 182/115; 244/53 R, 53 B, 129.4
See application file for complete search history.

(56) References Cited

U.S. PATENT DOCUMENTS

| 2,362,170 | A | * | 11/1944 | Swaisgood | 182/1 |
| 2,680,593 | A | * | 6/1954 | McIntyre | 182/231 |
| 2,798,652 | A | * | 7/1957 | Easton | 182/17 |
| 2,828,166 | A | * | 3/1958 | Herring | 182/101 |
| 2,978,062 | A | * | 4/1961 | Di Camillo et al. | 182/1 |
| 3,451,404 | A |   | 6/1969 | Self | |
| 3,451,504 | A | * | 6/1969 | Logan | 182/1 |
| 4,312,619 | A | * | 1/1982 | Anderson et al. | 414/347 |
| 4,440,265 | A | * | 4/1984 | Spagnoli | 182/129 |
| 4,461,455 | A | * | 7/1984 | Mills et al. | 254/3 R |
| 4,520,996 | A | * | 6/1985 | Viglione et al. | 254/9 C |
| 5,411,111 | A | * | 5/1995 | Greve | 182/17 |
| 5,595,470 | A | * | 1/1997 | Berkey et al. | 414/495 |
| 5,839,874 | A | * | 11/1998 | Johnston | 414/459 |
| 6,062,809 | A | * | 5/2000 | Berkey et al. | 414/809 |
| 6,234,272 | B1 | * | 5/2001 | Plentl, Jr. | 182/115 |

(Continued)

FOREIGN PATENT DOCUMENTS

| DE | 9307330.5 U1 | 12/1993 |
| EP | 1348626 A1 | 10/2003 |
| GB | 742771 | 1/1956 |

OTHER PUBLICATIONS

International Search Report PCT/FR2008/000865; Dated Feb. 5, 2009.

*Primary Examiner* — Katherine Mitchell
*Assistant Examiner* — Candace L Bradford
(74) *Attorney, Agent, or Firm* — Brinks Gilson & Lione (57) ABSTRACT

This maintenance trolley (17) for the air intake (9) of the nacelle of an aircraft turbojet engine is notable in that it comprises a base (19) and a platform (23) cantilever-mounted on this base (19) and designed to enter said air intake (9) without contact therewith.

10 Claims, 5 Drawing Sheets

(56) References Cited

U.S. PATENT DOCUMENTS

| | | | |
|---|---|---|---|
| 6,447,044 B1 * | 9/2002 | Buker et al. | 296/99.1 |
| 6,467,576 B2 * | 10/2002 | Figura et al. | 182/63.1 |
| 6,772,860 B1 * | 8/2004 | Nelson | 182/115 |
| 7,103,952 B2 * | 9/2006 | Appleton et al. | 29/281.4 |
| 7,828,116 B2 * | 11/2010 | Vetesnik | 182/18 |
| 2005/0217937 A1 * | 10/2005 | Rohlf | 182/232 |
| 2005/0247517 A1 * | 11/2005 | Vetesnik | 182/12 |

* cited by examiner

AIRCRAFT TURBOJET ENGINE NACELLE AIR INTAKE MAINTENANCE TROLLEY

TECHNICAL FIELD

The present invention relates to a maintenance trolley for an aircraft turbojet engine nacelle air intake.

BACKGROUND

As is known per se, an aircraft turbojet engine nacelle comprises an upstream part commonly known as the "air intake", followed by a central part and a downstream part.

The downstream part envelops the engine part of the turbojet, the central part envelops the fan of this turbojet, and the air intake channels external air toward the fan then toward the engine.

Certain maintenance operations, such as checking the state of the fan blades, require an operator to enter the air intake.

Such entry is tricky, firstly, because it is performed in a region that is not flat and in which the operator may have difficulty in keeping his balance, and also because it may, under the weight of the operator, lead to damage to certain sensitive components positioned inside the air intake, such as acoustic absorption panels.

BRIEF SUMMARY

The disclosure provides means that allow an operator to access the inside of a nacelle air intake without this action presenting the aforementioned disadvantages.

The disclosure more particularly provides a maintenance trolley for the air intake of an aircraft turbojet engine nacelle, notable in that it comprises a base and a platform cantilever-mounted on this base and designed to enter said air intake without contact therewith.

By virtue of the presence of such a platform, an operator can enter the air intake in a very stable way without the risk of damaging components located inside this air intake.

According to other optional features of the trolley according to the invention:
  with said air intake comprising a lip and said turbojet engine comprising a fan, the length of the cantilevered part of said platform is at least equal to the horizontal distance separating the lower edge of said lip from the blades of said fan, decreased by a minimum safety distance at the end of said cantilevered part in relation to said blades, and increased by a minimum buffer distance of said trolley against said lip: by virtue of such a length, there is the certainty that the platform, while providing access as far as the fan blades, does not carry the risk of butting against these blades and damaging them;
  the length of said platform is substantial equal to the horizontal distance separating the lower edge of said lip from the blades of said fan when said air intake is in the operating position, decreased by the minimum safety distance and increased by said minimum buffer distance: this embodiment allows the fan blades to be reached in complete safety when the air intake is in the operating position,
  when said air intake comprises an acoustic shroud fixed to a casing of said fan and an outer structure incorporating said lip, mounted such that it can slide with respect to said acoustic shroud between an operating position in which said lip lies in the continuation of said acoustic shroud, and an extreme maintenance position in which said lip is spaced away from said acoustic shroud, the length of said platform is substantially equal to the horizontal distance separating the lower edge of said lip from the blades of said fan when said outer structure is in its extreme maintenance position, decreased by said minimum safety distance and increased by said minimum buffer distance: this embodiment allows the fan blades to be reached in complete safety both when the air intake is in the operating position and when it is in the maintenance position;
  when said air intake comprises an acoustic shroud fixed to a casing of said fan and an outer structure incorporating said lip mounted such that it can slide with respect to said acoustic shroud between an operating position, in which said lip lies in the continuation of said acoustic shroud, and an extreme maintenance position in which said lip is spaced away from said acoustic shroud, said platform comprises a pull-out panel that can move between a retracted position that gives said platform a length substantially equal to the horizontal distance separating the lower edge of said lip from the blades of said fan when said outer structure is in its normal operating position decreased by said minimum safety distance and increased by said minimum buffer distance, and a pulled-out position giving said platform a length substantially equal to the horizontal distance separating the lower edge of said lip from the blades of said fan when said outer structure is in its extreme maintenance position, decreased by said minimum safety distance and increased by said minimum buffer distance: this embodiment is an advantageous alternative to the previous embodiment, and on the one hand allows the length of the platform to be adapted to suit the (intermediate or extreme) maintenance position of the air intake and, on the other hand, makes it possible to reduce the overall size of the trolley when it is parked;
  the trolley according to the invention comprises indexing means for indexing the position of said pull-out panel: these means make it possible to prevent any unwanted sliding movement of the pull-out panel in relation to the platform;
  the trolley according to the invention comprises a height-adjustable support cradle for supporting said air intake: by virtue of such a cradle, the trolley according to the invention can be used for handling operations, which means that there is no need to resort to special tooling in order to perform such operations;
  said cradle comprises one rear support point and two lateral support points situated at the ends of two symmetric arms: this arrangement allows statically-determinate handling of the air intake;
  said arms can move between a deployed position and a folded position: this feature limits the size of the trolley when there is no desire to use the handling means;
  said arms can be adjusted so that they can collaborate as much with said outer structure as with said acoustic shroud;
  said platform is arranged in relation to said base in such a way that the projection onto the ground of the center of gravity of the assembly formed by said platform and an operator moving around on this platform falls inside the polygon defined by the support points of said base on the ground: this arrangement gives the trolley optimum stability when an operator is moving around on the platform;
  the trolley according to the invention comprises means for rolling said base along the ground: such rolling means make the trolley easier to move around;

the trolley according to the invention comprises means for braking said rolling means: these braking means allow the trolley to be immobilized when an operator is working inside the air intake, thus improving the safety of this operator and limiting the risks of the trolley knocking against the air intake;

the trolley according to the invention comprises steps to gain access to said platform: such steps allow an operator to access the platform easily;

the trolley according to the invention comprises a guard rail at least in the region of said platform: such a guard rail limits the risks of the operator falling.

BRIEF DESCRIPTION OF THE DRAWINGS

Other features and advantages of the present invention will become apparent from the description which will follow and from studying the attached figures in which.

DETAILED DESCRIPTION

Figure 1:
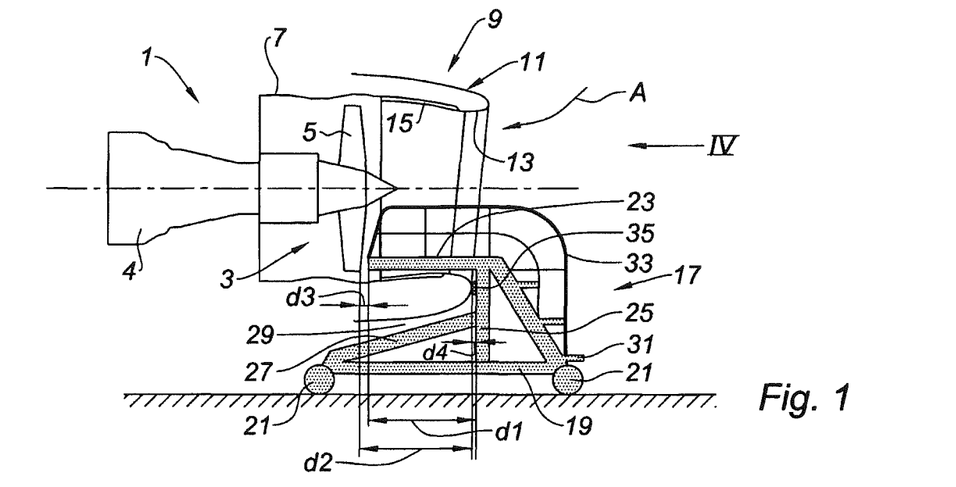
FIG. 1 schematically depicts a trolley according to a first embodiment of the invention, collaborating with an air intake that is in a normal operating position, FIG. 2 differs from FIG. 1 in that the air intake is in an intermediate maintenance position, FIG. 3 differs from the preceding two figures in that the air intake is in an extreme maintenance position.

Reference is now made to FIG. 1 which depicts an aircraft turbojet engine 1, comprising a fan 3 upstream and an actual engine 4 downstream.

The fan 3 comprises blades 5 able to rotate at high speed inside a fan casing 7, so that external air can be drawn from the upstream end toward the downstream end of the turbojet engine, that is to say from right to left in FIG. 1, in the direction indicated by the arrow A.

Around the fan casing 7 and upstream thereof there is an air intake 9, that is to say a part of the nacelle of the turbojet engine 1 that is able to channel the external air toward the fan 3.

Although this is in no way limiting, this air intake 9 may be an air intake in accordance with the teaching of patent application FR06/08599 filed by the Applicant Company on 2 Oct. 2006.

In this case, the air intake 9 comprises an outer structure 11 incorporating a lip 13, and an acoustic shroud 15. Such an air intake is often termed "nacelle upstream cowl" and gives excellent aerodynamic performance because the lip is incorporated into the outer structure.

Figure 2:
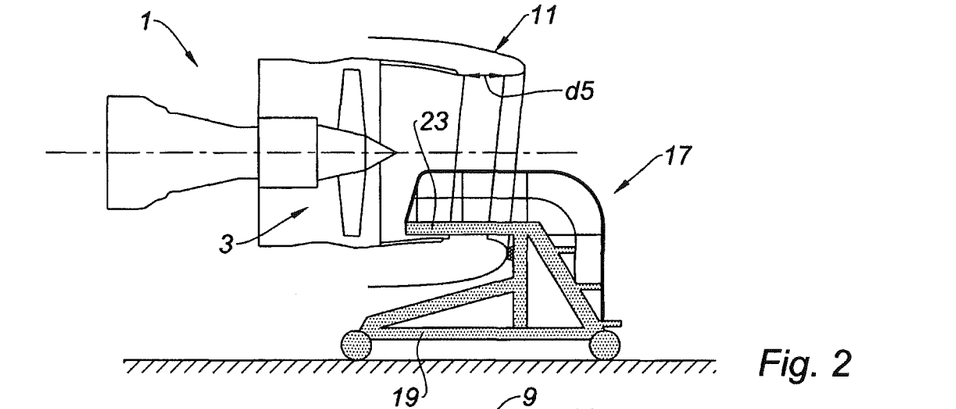
Figure 3:
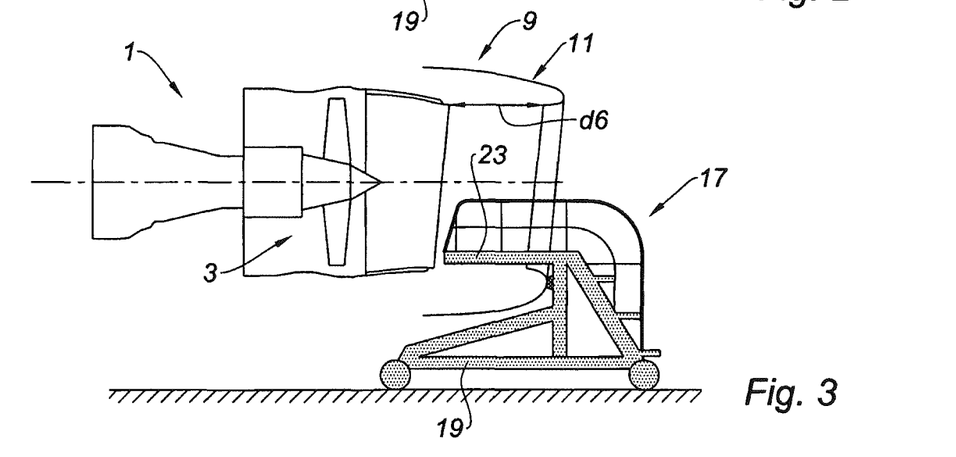
Figure 4:
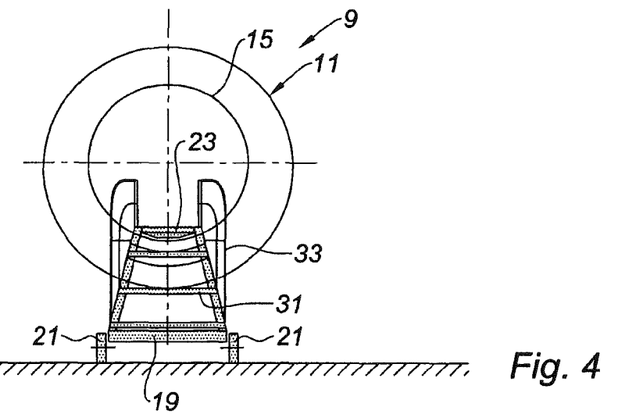
FIG. 4 is a view of the situation of FIG. 1 in the axial direction, that is to say in the direction IV of FIG. 1, FIGS. 5 and 6 are views similar respectively to views 1 and 3, of a second embodiment according to the invention, FIG. 5' is a view of detail V of FIG. 5, FIGS. 7 to 9 are views similar respectively to views 1 to 3, of a third embodiment of the invention.

More specifically, and as may be seen especially in FIGS. 2 and 3, the outer structure 11 is mounted such that it can slide in relation to the acoustic shroud 15 between a normal operating position (FIG. 1) and intermediate (FIG. 2) and extreme (FIG. 3) maintenance positions.

The acoustic shroud 15 which, for its part, includes a substantially cylindrical volume defined by acoustic absorption panels, is fixedly connected to the fan casing 7 by appropriate connecting means such as flanges (not depicted).

FIGS. 1 to 3 depict a first embodiment of a trolley 17 according to the invention. This trolley comprises a base 19 mounted on wheels 21, this base supporting a platform 23 via one or more post(s) 25, and appropriate bracing 27.

More specifically, the platform 23 is cantilever-mounted in relation to the base 19, which means to say that this platform defines a region 29 into which the lower part of the outer structure 11 can fit.

Steps 31 allow an operator to access the platform 23, a guard rail 33 for its part preventing this operator from falling off.

More specifically, the length of the platform 23, that is to say the distance d1 separating the posts 25 from the end 23 of this platform, is preferably substantially equal to the horizontal distance d2 separating the lower edge of the lip 11 from the blades 5 of the fan 3, decreased by a minimum safety distance d3 of the end of the platform 23 in relation to the blades 5, and increased by a minimum buffer distance d4 of the posts 25 against the lower edge of the lip 11.

The distance d3, which is preset, is a minimum distance that is to be observed in order to limit the risk of the end of the platform 23 interfering with the blades 5.

The distance d4 is the minimum distance obtained when the post 25 butts against the lower part of the lip 13 via a rubber buffer 35.

As can be seen in FIG. 1, when the outer structure 11 is in the normal operating position, the trolley 17 allows an operator to enter the air intake 9 and easily access particularly the blades 5 of the fan 3.

In the intermediate maintenance position depicted in FIG. 2, the outer structure 11 of the air intake has been slid upstream of the acoustic shroud 15 by a certain distance d5, which has an impact on the distance of the end of the platform 23 in relation to the blades 5.

In the extreme maintenance position (FIG. 3), this distance increases to a value d6, leading to a corresponding increase in the separation between the end of the platform 23 and the blades 5.

In this extreme maintenance position, the acoustic shroud 15 lies in the continuation of the platform 23 and it is possible to conceive of designing this shroud so that it is strong enough to allow an operator to step on it in order to reach the blades 5 of the fan 3.

Advantageously, brakes will be provided to immobilize the wheels 21, so that the trolley 17 can be immobilized in relation to the air intake during maintenance operations.

It will be noted that care will be taken to ensure that the trolley according to the invention is designed in such a way that the center of gravity of the entity formed by an operator and by the platform 23 is always projected onto the ground inside the polygon defined by the points of support of this trolley on the ground: this then prevents any risk of this trolley tipping.

Figure 5:
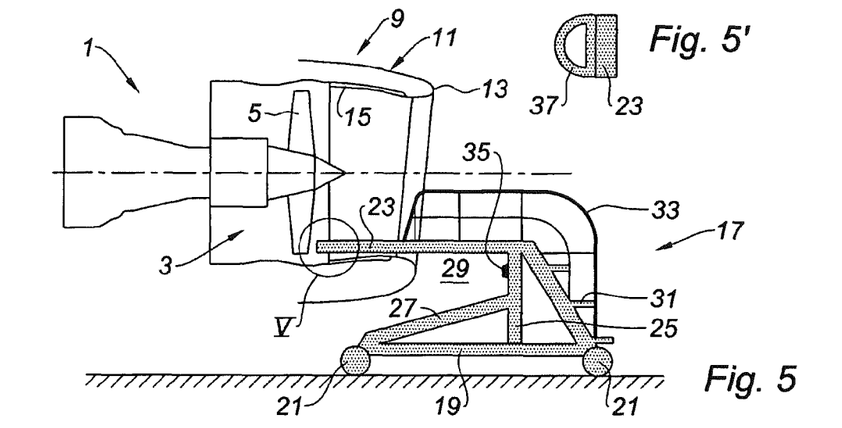
Figure 6:
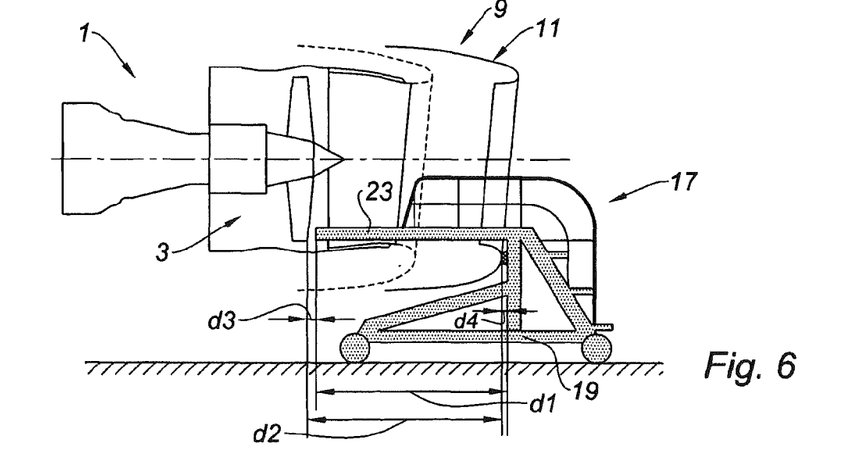

The embodiment of FIGS. 5 and 6 differs from the preceding embodiment in that the platform 3 is longer.

More specifically, the length dl of this platform is substantially equal to the horizontal distance d2 separating the lower part of the lip 13 from the blades 5 of the fan 3 when the outer structure 11 is in its extreme maintenance position (depicted in continuous line in FIG. 6), decreased by the distance d3 mentioned above, and increased by the distance d4 mentioned above.

As can be seen in FIG. 6, this second embodiment allows the platform 23 to be positioned over the acoustic shroud 15, even when the outer structure 11 is in the extreme maintenance position (FIG. 6).

When this outer structure 11 is in the normal operating position (FIG. 5), there is a risk that the end of the platform 23 might butt against the blades 5: this is why provision is made for a rubber buffer 37 to be positioned at the end of this platform (see FIG. 5').

This second embodiment is particularly suitable when the shroud 15 is not designed to take the weight of an operator.

Figure 7:
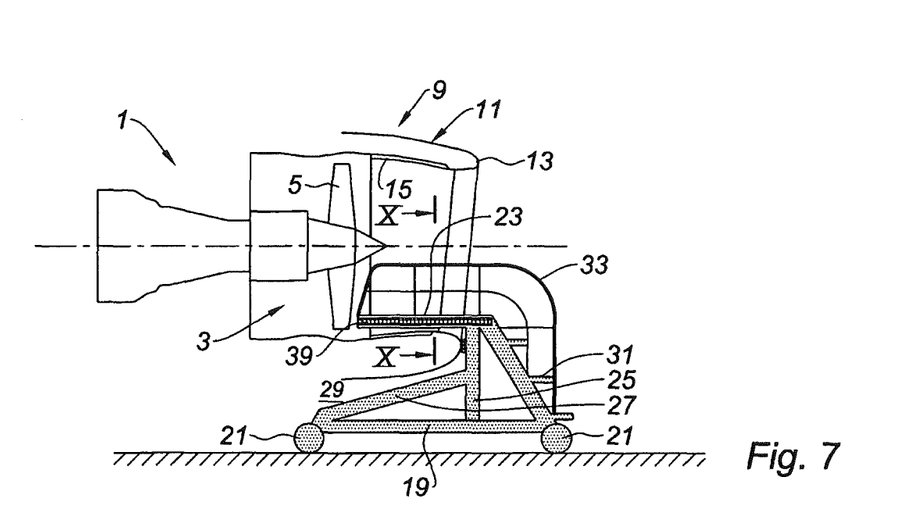
Figure 8:
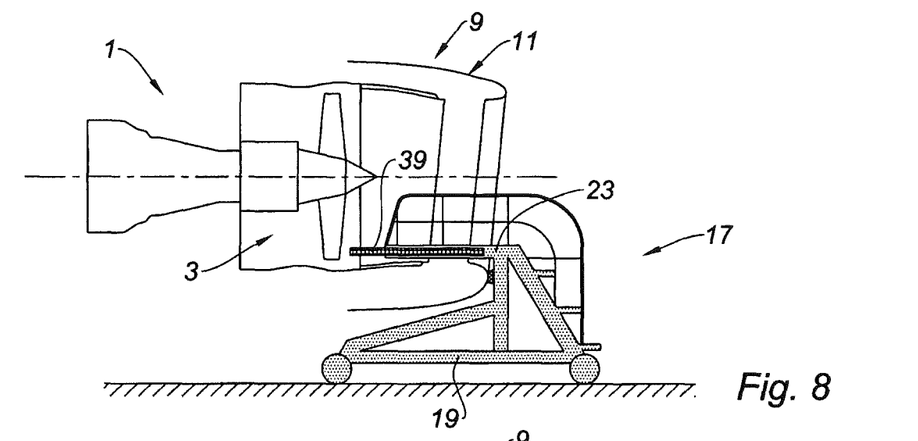
Figure 9:
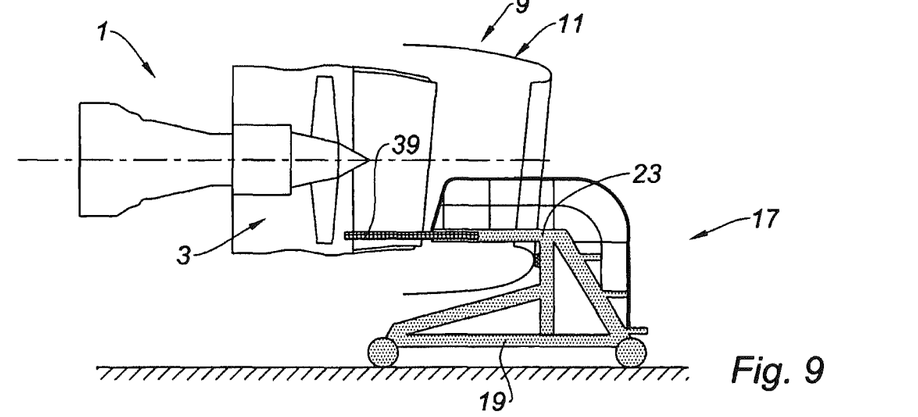

The third embodiment depicted in FIGS. 7 to 9 differs from the first embodiment in that the platform 23 incorporates a pull-out panel 39 mounted such that it can slide in relation to this platform between a retracted position (FIG. 7) that gives this platform a length substantially equal to that of the first embodiment, and a pulled-out position (FIG. 9) that gives this platform a length substantially equal to that of the second embodiment.

Of course, all intermediate positions of the pull-out panel 39 between these two extreme positions are conceivable (see FIG. 8).

This third embodiment is highly flexible because it allows the length of the platform 23 to be adapted to suit the actual position of the outer structure 11 in relation to the fan casing 7.

This third embodiment makes it possible to cross the acoustic shroud 15 irrespective of the position of the outer structure 11 while at the same time limiting the risks of the end of the platform butting against the blades 5, as is the case in the second embodiment (see FIG. 5).

Figure 10:
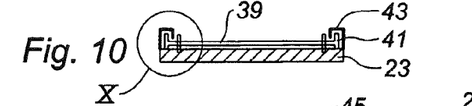
FIG. 10 is a cross section on X of the platform of the trolley of FIG. 7, FIGS. 10a and 10b depict a first alternative form of means of locking the pull-out panel of the platform of the trolley of FIG. 7, in the locked and unlocked positions respectively.

As can be seen in FIG. 10, the pull-out panel 39 can be slidably mounted on the platform 23 via rolling means such as rollers 41 running in rails 43.

Figure 10A:
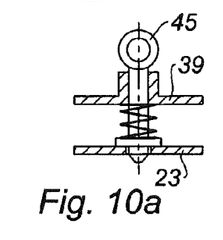
Figure 10B:
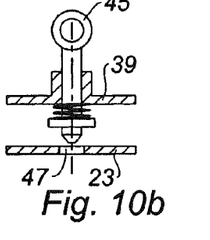

As depicted in FIGS. 10a and 10b, it is possible to provide means of indexing the position of the pull-out panel 39 in relation to the platform 23, it being possible for such means typically to comprise one or more spring-loaded pull-knob(s) 45 mounted on the pull-out panel 39 and designed to collaborate with the orifices 47 formed in the platform 23.

Figure 10C:
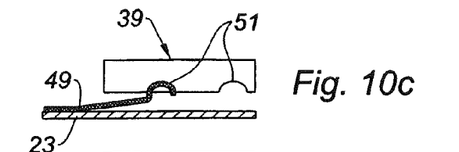
FIGS. 10c, 10d and 10e depict a second alternative form of these locking means, in a first locked position, in an unlocked position and in an intermediate position, respectively.
Figure 10D:
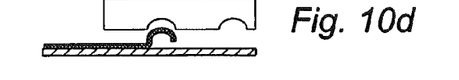
Figure 10E:
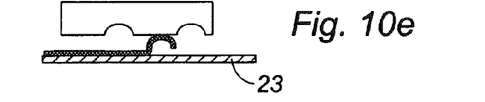

According to an alternative form that has been depicted in FIGS. 10c, 10d, 10e, the pull-out panel 39 can be immobilized in relation to the platform 23 by means of one or more elastic blade(s) 49 attached to the platform 23 and collaborating with indexing notches 51 formed in the pull-out panel 39.

Figure 11:
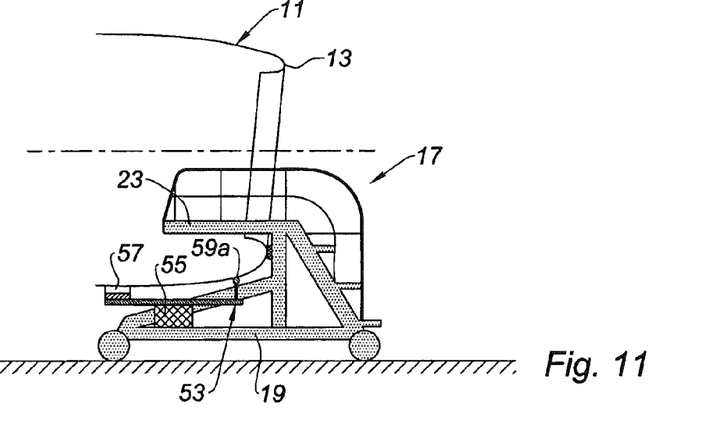
FIGS. 11 and 12 are, respectively, a side view and an axial view of a trolley according to the invention equipped with means of handling a nacelle air intake.
Figure 12:
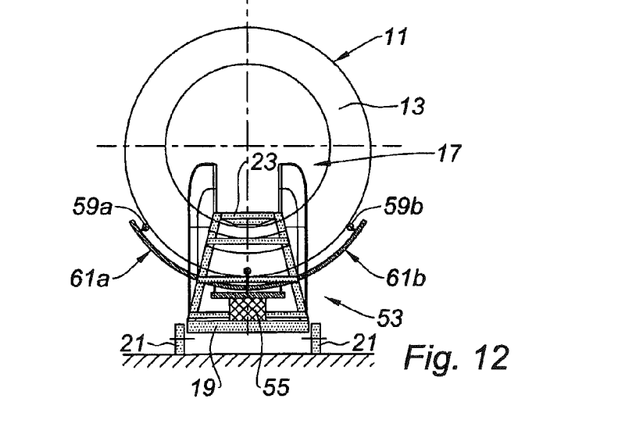

FIGS. 11 and 12 depict means of handling the outer structure which are installed on a trolley according to the first embodiment.

It goes without saying that these handling means may equally be installed on a trolley according to the second or to the third embodiment according to the invention.

These handling means comprise a cradle 53 mounted on the base 19 of the trolley 17 via a system 55 which provides both heightwise adjustment of this cradle and adjustment of the attitude thereof.

A system such as this will not be described in greater detail here because it falls within the overall competence of a technician capable of designing lifting and handling equipment.

Such a system may operate using mechanical means (racks and pinions for example) or hydraulic or even pneumatic means.

The cradle 55 comprises a rear attachment point 57 and two lateral attachment points 59a, 59b situated respectively at the ends of two symmetrical arms 61a, 61b.

The three attachment points 57, 59a, 59b are designed to be able to collaborate with attachment elements positioned at the periphery of the outer structure 11.

As will be appreciated, the cradle 53 allows the outer structure 11 to be set down without any additional tooling in relation to the trolley 17.

Of course, the geometry of the cradle 53 and the layout of the attachment points on the outer structure 11 are designed to optimize the position of the center of gravity of the outer structure 11 in relation to this cradle 53, so as to provide maximum stability during operations of handling this outer structure.

Installing the cradle 53 on the trolley 17 has the effect of appreciably increasing the size, particularly the lateral size, of this trolley.

Figure 13:
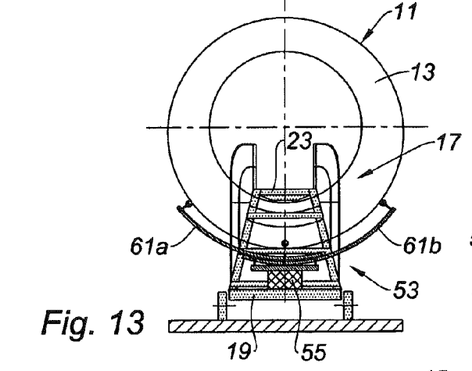
FIGS. 13 and 14 are, in axial view, an alternative form in which these handling means can be moved between a deployed position (FIG. 13) and a folded position (FIG. 14), and FIGS. 15 and 16 respectively are a side view and an axial view of a trolley according to the invention, in which said handling means are designed to collaborate with an acoustic shroud of a nacelle air intake.
Figure 14:
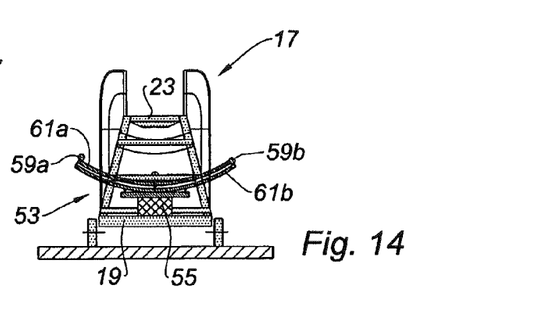

This is why an alternative form depicted in FIGS. 13 and 14 is conceivable, in which alternative form the two arms 61a, 61b of the cradle 53 can be mounted such that they can be moved between a deployed position (FIG. 13) and a folded position (FIG. 14). The folded position may be obtained, for example, by sliding the two arms 61a, 61b toward the inside of the trolley.

Figure 15:
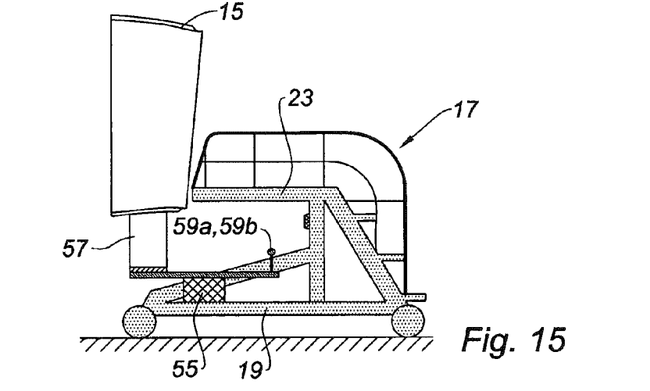
Figure 16:
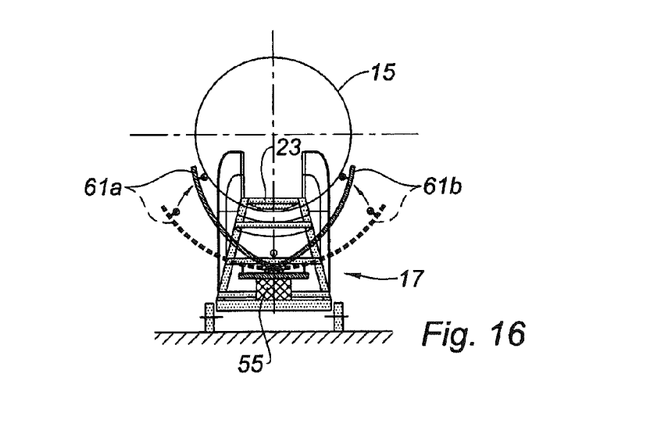

As can be seen in FIGS. 15 and 16, provision may also be made for the cradle 53 to be designed to perform handling operations on the acoustic shroud 15.

Because this acoustic shroud is located higher up than the outer structure 11, and has a diameter smaller than that of the latter structure, it is necessary on the one hand, to ensure that the rear support point 57 of the cradle 53 is raised up further in relation to the situation depicted in FIGS. 11 to 14 and also that the two arms 61a, 61b can be moved from the position depicted in dotted line in FIG. 16 to the position depicted in continuous line in this figure.

More specifically, as may be seen in FIG. 16, the two arms 61a, 61b are folded upward so that they can correctly hug the acoustic shroud 15.

As will be appreciated from the foregoing, installing handling means on the trolley according to the invention is highly advantageous because that gives a tool that can be used both to position the outer structure 11 or the acoustic shroud 15 very accurately in relation to the fan casing 7 and to enter the air intake 9.

It may be noted that the cradle 53 can be mounted fixedly on the trolley 17, or alternatively, removably.

It may also be noted that it is conceivable for the adjustment system 55 to be automatic or manual.

As will be appreciated from the foregoing description, the trolley according to the invention offers a very good way of accessing the inside of a nacelle air intake, both in terms of personnel safety and in terms of protecting the sensitive components located in the region of this air intake.

When this trolley is equipped with means of handling the air intake, it offers a convenient and accurate means of fitting/ setting down this air intake, making it possible to dispense with the need for special purpose tooling.

Of course, the present invention is not in any way restricted to the embodiments described and depicted, which have been provided simply by way of example.

Thus, for example, the trolley according to the invention could be used on a conventional air intake in which the lip is attached to the outer structure rather than incorporated into the latter, and/or in which the outer structure+lip assembly is not slidably mounted with respect to the fan casing.

The invention claimed is:

1. A maintenance trolley for an air intake of an aircraft turbojet engine nacelle, comprising:
a base;
a platform which is cantilever-mounted on the base;
at least one post supporting the platform,
wherein the platform, the base and the at least one post define a region into which a lower part of an outer structure of the air intake of the aircraft turbojet engine nacelle fits and which enters said air intake without contact therewith; and
a rubber buffer attached to a vertical part of the at least one post, the rubber buffer configured to provide a minimum distance from said lower part of the outer structure of the air intake when said lower part of the outer structure of the air intake butts against the at least one post via the bumper.

2. The trolley as claimed in claim 1, said air intake comprising a lip and said turbojet engine comprising a fan, wherein a length of the cantilevered part of said platform is at least equal to a horizontal distance separating a lower edge of said lip from blades of said fan, decreased by a minimum safety distance of an end of said platform in relation to said blades, and increased by a minimum buffer distance of said trolley against said lip.

3. The trolley as claimed in claim 2, wherein an arrangement of said platform, the at least one post and said base is configured to project a center of gravity of an assembly formed by said platform and an operator moving around on said platform onto a ground inside a polygon defined by support points of said base on the ground.

4. The trolley as claimed in claim 1, further comprising a height-adjustable support cradle for supporting said air intake.

5. The trolley as claimed in claim 4, wherein said cradle comprises one rear support point and two lateral support points situated at ends of two symmetric arms.

6. The trolley as claimed in claim 5, wherein said arms are movable between a deployed position and a folded position.

7. The trolley as claimed in claim 1, further comprising means for rolling said base along a ground.

8. The trolley as claimed in claim 7, further comprising means for braking said rolling means.

9. The trolley as claimed in claim 1, further comprising steps to gain access to said platform.

10. The trolley as claimed in claim 1, further comprising a guard rail at least in a region of said platform.

* * * * *